UNITED STATES PATENT OFFICE.

OSCAR FOERSTER, OF NEW YORK, N. Y., ASSIGNOR OF ONE-HALF TO ARTHUR JAEGER, OF NEW YORK, N. Y.

METHOD OF PRODUCING PRINTING-SURFACES.

1,265,641.  Specification of Letters Patent.  Patented May 7, 1918.

No Drawing.  Application filed March 26, 1917.  Serial No. 157,551.

*To all whom it may concern:*

Be it known that I, OSCAR FOERSTER, a citizen of the United States, residing at New York city, in the county of New York and State of New York, have invented certain new and useful Improvements in Methods of Producing Printing-Surfaces, of which the following is a specification.

My invention relates to methods of producing grain screen plates for reproducing pictures by the well known lithographic and plate printing methods and my object is the production of glass plate, celluloid, or any other suitable material negatives or positives for producing printing surfaces on stone, zinc, aluminum, copper or other suitable base, and also for producing intaglio plates having an irregular screen grain the texture of which is under the full control of the operator.

The negatives or positives produced by my method have an irregular, fine, open and sharp surface grain producing printing surfaces that meet all the requirements for steam press work of a high degree of excellence and are capable of producing highly artistic results.

The grain is absolutely under the control of the operator and any desired degree of fineness of the grain can be produced according to the requirements of the subject to be reproduced.

I will describe my method as applied to the production of glass negatives or positives embodying the grain screen as that is the base usually employed in practice.

In preparing my grain screen plate I first prepare the following solutions:—

(A) Albumen _____ 10 gms.
    Water _____ 80 cc.

(B) Ammonium chlorid _____ 10 gms.
    Water _____ 100 cc.

(C) Ammonium bichromate ___ 1 gm.
    Water _____ 30 cc.

and mix the three solutions in the following proportions:—50 cc. of A, 60 cc. of B and 15 cc. of C, which I call solution No. 1. This solution No. 1 is poured over a thoroughly clean glass plate at a temperature of about 16° C. and the surplus solution drained off after which the plate is dried in the dark.

When dried the coated plate is exposed, face down, on a non-actinic surface to diffused daylight for a short time.

I next prepare the following solution which I call No. 2:

(A) Soft gelatin _____ 50 gms.
    Water _____ 500 cc.

(B) Potassium bichromate ___ 10 gms.
    Ammonium bichromate __ 5 gms.
    Water _____ 100 cc.

(C) Calcium oxid _____ 10 gms.
    Salicylic acid _____ 5 gms.
    Magnesium oxid _____ 3 gms.
    Sodium sulfite _____ 5 to 10 gms.

10 gms. is the normal amount of sodium sulfite used and is decreased to a minimum of 5 gms. in event of extreme humidity.

A is dissolved at a temperature of 65° C. and B is added while stirring. C is finally well stirred into the mixture until homogeneous after which it is freed from bubbles.

The sub-coated glass plate is then heated to about 50° C. and solution No. 2, at the same temperature, is poured over the coated side and subjected to a temperature of about 65° C. for about two hours in a level position.

When cooled the prepared plate is exposed under a negative or positive after which it is immersed in luke warm water until the grain is visible. It is then washed in cold water until it attains a silver gray color. It may then be hardened in any suitable hardening bath if desired.

The plate is again washed if the hardening bath has been used and the surplus moisture removed until the surface is sticky or adhesive.

Finely powdered opaque or non-actinic material which is unaffected by the etching fluid later employed, such as bronze powder, is dusted over the sticky surface and the dusted plate permitted to dry. The plate is next placed in an etching fluid, such as a highly diluted solution of hydrochloric acid in water, and very carefully developed by gently rubbing with cotton. The non-actinic powder must remain in the microscopic depressions in the surface of the film and development should continue until the finest white dots appear in the shadows and the finest black dots appear in the high lights for a negative plate and the reverse for a positive plate.

After development by etching the plate is washed, dried and varnished if desired.

The grain screen plate is then ready to be used in the regular photo-lithographic processes of producing printing surfaces.

The prepared, sensitized plate may be photographed upon in the camera if desired instead of being printed under a negative or positive.

The finally developed plate may be manipulated with transfer ink and a leather roller for the purpose of producing transfer impressions.

Grain screens may be prepared by my method for use either in the camera or printing frame in the manner well known to photo-engravers but screens so used never produce as fine results as the preferred methods above described by the practice of which the screen is incorporated in the positive or negative itself.

I claim:—

1. The method of producing grain screen plates having a fine, sharp, irregular grain comprising coating a plate with a bichromated gelatin containing grain producing material, exposing it to the action of light, removing the unaltered gelatin, rendering the gelatin surface adhesive, dusting thereon a non-actinic powder and finally removing the powder adhering to the high points in the gelatin coating.

2. The method of producing grain screen plates having a fine, sharp, irregular grain comprising coating a glass plate with bichromated albumen, exposing the back thereof to the action of light, removing the unaffected albumen, coating the albuminized plate with bichromated gelatin containing grain producing material, exposing the double-coated plate to the action of light, removing the unaffected gelatin, rendering the surface adhesive, dusting thereon a non-actinic powder and finally removing the powder adhering to the high points in the gelatin coating.

3. The method of producing grain screen plates consisting in coating a plate with bichromated gelatin containing a grain producing substance, exposing it to the action of light, removing the unaffected gelatin, hardening the remaining gelatin, rendering the surface adhesive, dusting thereon a non-actinic powder and finally removing the powder adhering to the high points in the gelatin coating.

In testimony whereof I have affixed my signature in the presence of two witnesses.

OSCAR FOERSTER.

Witnesses:
 ROBERT B. KILLGORE,
 RALPH JAEGER.